United States Patent
Fischer et al.

(10) Patent No.: US 9,827,516 B2
(45) Date of Patent: Nov. 28, 2017

(54) SOOT WATER CLEANING BY MEANS OF CONTINUOUS PRESSURE FILTRATION

(75) Inventors: Norbert Fischer, Lichtenberg (DE); Frank Hannemann, Freiberg (DE); Friedemann Mehlhose, Freiberg (DE); Mirko Putz, Freiberg (DE); Peter Taffelt, Freiberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 817 days.

(21) Appl. No.: 13/989,190

(22) PCT Filed: Nov. 16, 2011

(86) PCT No.: PCT/EP2011/070239
§ 371 (c)(1),
(2), (4) Date: Jul. 17, 2013

(87) PCT Pub. No.: WO2012/076305
PCT Pub. Date: Jun. 14, 2012

(65) Prior Publication Data
US 2013/0292314 A1    Nov. 7, 2013

(30) Foreign Application Priority Data
Dec. 9, 2010 (DE) .......... 10 2010 062 769

(51) Int. Cl.
*B01D 29/52* (2006.01)
*C10J 3/48* (2006.01)
(Continued)

(52) U.S. Cl.
CPC ............. *B01D 29/52* (2013.01); *C10J 3/485* (2013.01); *C10J 3/78* (2013.01); *C10J 3/84* (2013.01);
(Continued)

(58) Field of Classification Search
CPC .......... B01D 29/51; B01D 35/16; C10J 3/485; C10J 3/78; C10J 3/84; C10J 2300/169
See application file for complete search history.

(56) References Cited

U.S. PATENT DOCUMENTS 3,692,178 A * 9/1972 Reece ................. B01D 29/114
210/333.1
5,415,673 A * 5/1995 Hilton ..................... C01B 3/32
252/373

(Continued)

FOREIGN PATENT DOCUMENTS

DE        69405841 T2    1/1998
DE    102008059488 B3    9/2010

(Continued)

OTHER PUBLICATIONS

Gosele W. et al: Filtration, Wiley-VCH Verlag GmbH & Co. KGaA, pp. 1-66, 2005.

*Primary Examiner* — Terry Cecil

(57) ABSTRACT

A pressure filtration system for cleaning residual quenching water of a gasifying device that gasifies carbon-containing fuels under elevated pressure is provided. The soot water from the quencher is passed to a filter system, which has pressure filter chambers operating alternately in filtering mode under gasifying pressure or in cleaning mode. The filtrate from these chambers is passed to a quenching water reservoir, from which the quencher is fed with quenching water. Only small temperature and pressure losses with respect to the residual quenching water leaving, and only a small additional amount of energy has to be expended to overcome the remaining pressure difference to bring the filtrate that is to be returned back to the gasifying pressure. The residual quenching water is cleaned substantially under gasifying pressure in a pressure filter, avoids flash evaporation of the residual quenching water into the vacuum area, (Continued)

with vapour cooling and a subsequent increase in pressure and reheating.

10 Claims, 3 Drawing Sheets

(51) Int. Cl.
*C10J 3/78* (2006.01)
*C10J 3/84* (2006.01)
*B01D 35/16* (2006.01)

(52) U.S. Cl.
CPC ......... *B01D 35/16* (2013.01); *C10J 2300/169* (2013.01); *Y02E 20/18* (2013.01)

(56) References Cited

U.S. PATENT DOCUMENTS 7,011,741 B2* 3/2006 Benesi ............... B01D 25/1275
           210/103
2003/0047716 A1* 3/2003 Tsang ................... C01B 3/50
           252/373

FOREIGN PATENT DOCUMENTS

| DE | 102009012556 A1 | 9/2010 |
|----|-----------------|--------|
| EP | 0461385 B1 | 2/1993 |
| EP | 0648828 B1 | 9/1997 |
| JP | 2005097464 A | 4/2005 |
| WO | WO 03022959 A1 | 3/2003 |
| WO | WO 2009109330 A2 | 9/2009 |

\* cited by examiner

SOOT WATER CLEANING BY MEANS OF CONTINUOUS PRESSURE FILTRATION

CROSS REFERENCE TO RELATED APPLICATIONS

This application is the US National Stage of International Application No. PCT/EP2011/070239 filed Nov. 16, 2011 and claims benefit thereof, the entire content of which is hereby incorporated herein by reference. The International Application claims priority to the German application No. 102010062769.0 DE filed Dec. 9, 2010, the entire contents of which is hereby incorporated herein by reference.

FIELD OF INVENTION

The invention relates to a pressure filtration system for cleaning residual quench water from a gasifying device that gasifies carbon-containing fuels under raised pressure.

BACKGROUND OF INVENTION

In present-day gasification processes, the excess residual quench water arising during entrained-flow gasification is taken through one or more stages in the soot water flash-evaporation system from the gasification pressure to a pressure below the ambient pressure, which can be between 2 and 5 MPa (20 and 50 bar), and is therein usually first cooled to approximately 100-110° C. and then to approximately 50-80° C. The soot water under pressure is therein flash-evaporated in the first stage to around ambient pressure by means of special control valves. The resulting flash steam/liquid mixture is separated in a knock-out vessel before the liquid phase is similarly fed to a second flash-evaporation vessel in which expansion into the vacuum region takes place. The liquid phase that is separated off here is mixed during the ensuing soot water conditioning process with flocculant to promote the separating of solids in the downstream thickener/lamella clarifier. The underflow here augmented with solid material (slurry) arrives at another dewatering stage. Clarified effluent from the thickener/lamella clarifier and the filtrate of that dewatering stage (press filtration, for example) are buffered and returned to the gasification process via appropriate high-pressure pumps as circulation water.

Only by means of the described two-stage flash-evaporation operation can the solids-laden soot water be cooled in the necessary manner without making contact with heat transfer surfaces and simultaneously fed without pressure to the robust solids-separating stage employed consisting of a thickener/lamella clarifier and another dewatering stage.

Because the thus cleaned soot water is returned to virtually the same place in the process, the flash-evaporated and cooled water has to be restored to its relevant gasification pressure and, if possible, also heated. Owing to the shifted ratio of calcium to carbonic acid in the flash-evaporated liquid and the pH values >8, this, however, results in the formation of carbonates and hence of bonded deposits and stratifications especially on the heat transfer surfaces. Because the returned soot water is not or is only partially heated, the temperature of the quench water drops, thereby resulting in a reduced water-absorbing capability of the raw gas. This in turn necessitates the addition of more steam upstream of the CO shift system and so leads to higher operating costs.

On the one hand, in order to avoid incrustations/deposits in the heat exchangers, the returned, cleaned soot water is conventionally not heated when 2-stage flash evaporation is employed. The make-up water added to the process is instead heated to the desired quench water temperature. On the other hand, since that does not suffice in many cases, a small amount of high-pressure steam is injected upstream of the CO shift system.

SUMMARY OF INVENTION

The problem addressed by the invention is to embody the return for the residual quench water in such a way that the overhead necessary to increase the pressure and a rise in the pH value due to the calcite precipitation associated with the flash-evaporating process will be substantially reduced.

The problem is resolved by means of a pressure filter system having the features of the claims.

In the inventive pressure filtration system the soot water from the quencher is fed directly to a quasi-continuously operating pressure filter system operating at reactor pressure and cleaned. The filtrate flowing from the pressure filter system is collected in the quench water reservoir (10) and fed back as quench water. The filter system (1) operates so quasi-continuously that the quench water flowing away can be subjected to continuous fill-level regulation (9) with simultaneous spatial and temporal separation of the process steps of 1) filtration, 2) filter cleaning, and 3) filter cake discharging. Switching over between the spatially and temporally separately executing process steps of 1) filtration, 2) filter cleaning, and 3) filter cake discharging can take place in a merging manner such that fill-level regulation (9) will be ensured. The filter cake discharge in the form of a slurry is cooled by means of a slurry cooler (2) designed for solids to temperatures of between 40 and 90° C. and then flash-evaporated (3). The thus prepared slurry is fed to a concentrating process that employs press filtration (5). The vent gas (25) arising in the flash-evaporation stage (3) is removed via a vent gas system (24).

The slag water (16) from the gasifying device is freed from coarse solid constituents by means of a hydrocyclone station (6) or another filter unit and fed along with the slurry from the pressure filtration system to the concentrating process or, as the case may be, press filtration (5). The cleaned/filtered slag water (28) is added directly to a wastewater receptacle (12) in order to return it to the process as scrubbing water (18) if needed via the scavenge pump (11) or expel it as waste (14) by means of a wastewater pump (13). Prior to being fed to the quench water reservoir (10) the cleaned/filtered soot water is cooled during the shutdown process by means of shutdown coolers (8) with an accompanying reduction in pressure to prevent the circulation water from evaporating when the evaporating temperature is reached.

In the absence of a pressure gradient above the filtration system, especially in startup mode, the soot water or, as the case may be, residual quench water can be fed to the filtration system via booster pumps/pressure-raising pumps (7).

The filtration system can be formed from one or more parallel filters consisting of a plurality of chambers.

The filter can be cleaned by backwashing with generated filtrate or external demineralized water, boiler feedwater, or pressurized water of similar quality.

Advantages of the invention are to be found in avoiding flash evaporation of the residual quench water into the vacuum area, with vapor cooling and a subsequent increase in pressure and reheating. The electric energy requirement of the gasification process itself can in that way be reduced by orders of magnitude and the energy content and associated water content of the raw gas can be set to the steam contents required for the CO shift reaction without additional amounts of heat being consumed. That results altogether in an improvement to the overall efficiency of IGCC and chemical synthesis processes. Calcite precipitation in the soot water system is advantageously avoided because no flash evaporation and preheating of the residual quench water requiring to be returned will be necessary.

The idea underlying the invention is to clean the residual quench water via a pressure filtration operation and return it to the process again as quench water. Slight advance (intermediate) flash evaporation may be necessary depending on the filter material used and the pressure difference requiring to be set. The slurry separated from the filter unit (1) is cooled (2), reduced in pressure (3), and fed to a sludge storage tank that feeds a downstream filter press (5) for producing filter cakes (26). The additional relatively small amount of cold, solids-laden slag water from the slag sluice system is cleaned under slight pressure via a further filter or hydrocyclone. The fine slag or, as the case may be, sludge separated at this process step is likewise fed to the sludge storage tank.

The soot water is therefore cleaned in a pressure filter substantially under gasification pressure.

Advantageous developments of the invention are described in the dependent claims.

BRIEF DESCRIPTION OF THE DRAWINGS

The invention is explained in more detail below as an exemplary embodiment to an extent necessary for understanding with reference to figures, in which.

Like elements are identified in the figures by like reference numerals.

DETAILED DESCRIPTION OF INVENTION

Figure 1:
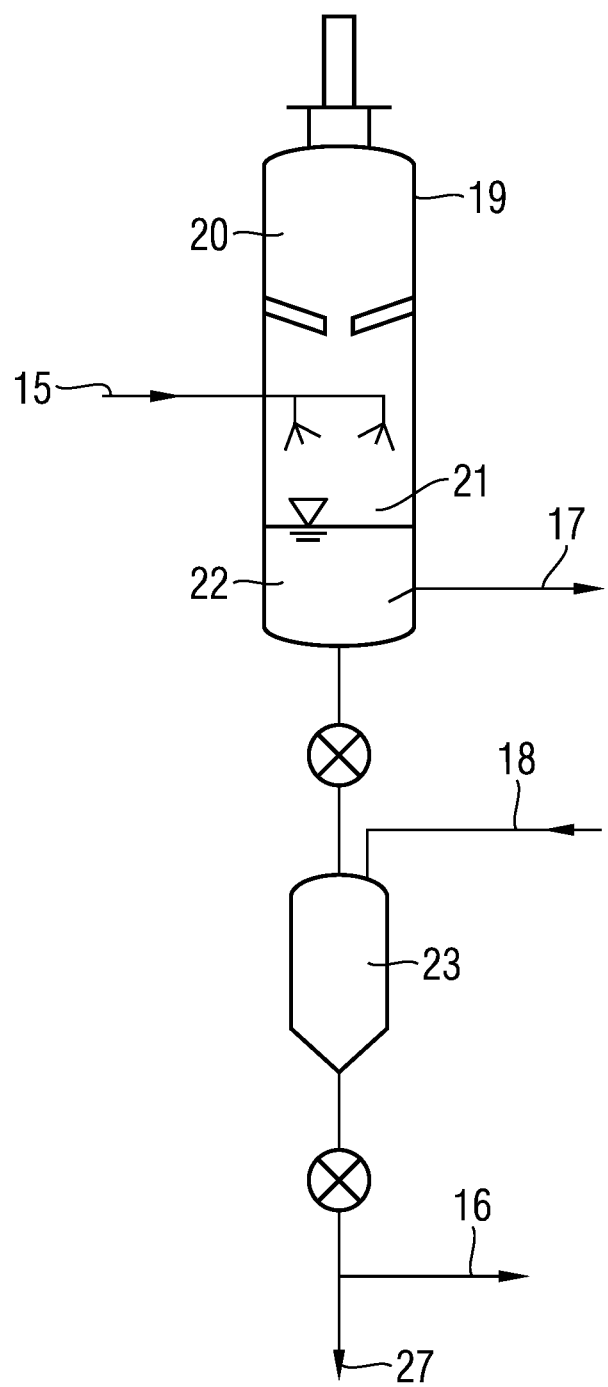
FIG. 1 is a schematic of an entrained-flow gasifier having a quencher and slag sluice.

In a reaction chamber 20 of the gasification reactor 19, carbon-containing fuel such as, for example, pneumatically conveyed coal dust or coal dust slurries with water or oil as the carrier is gasified together with oxygen and water vapor at temperatures of 1550° C. and at 2 to 5 MPa (20 to 50 bar), with raw gas and liquid slurry being produced as a result which are jointly cooled in the quenching chamber 21 to saturation temperature through the injection of water 15. Water 15 is for that purpose atomized in the quenching chamber, with one part being vaporized and hence saturating the raw gas and the remaining part being removed dust-laden as excess soot water 17.

The slurry collecting in the sump 22 of the quencher is cyclically expelled via a slag sluice 23, with slurry 27 and slag water 16 being removed. The slag system can be scrubbed with scrubbing water 18.

Figure 2:
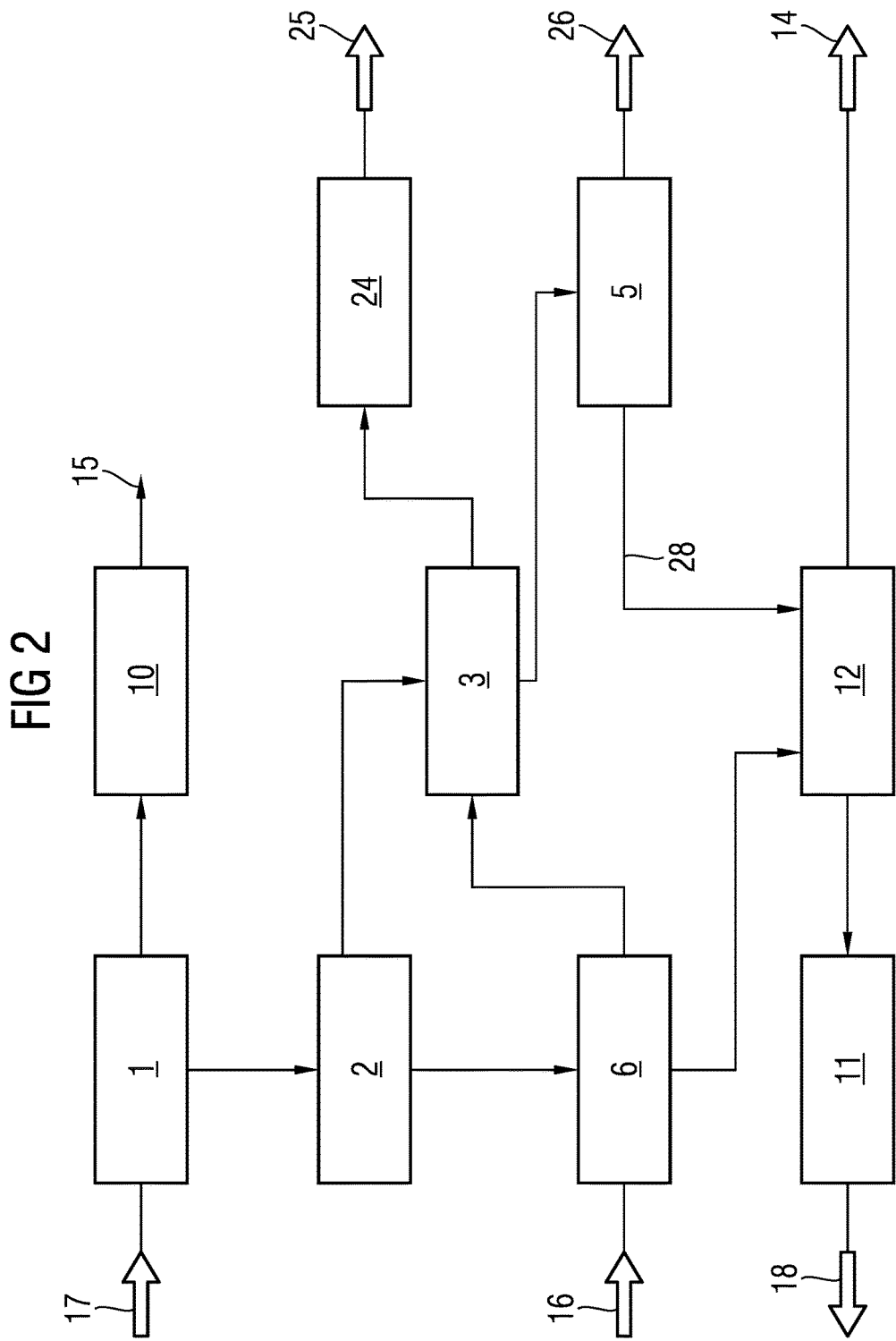
FIG. 2 is a schematic.
Figure 3:
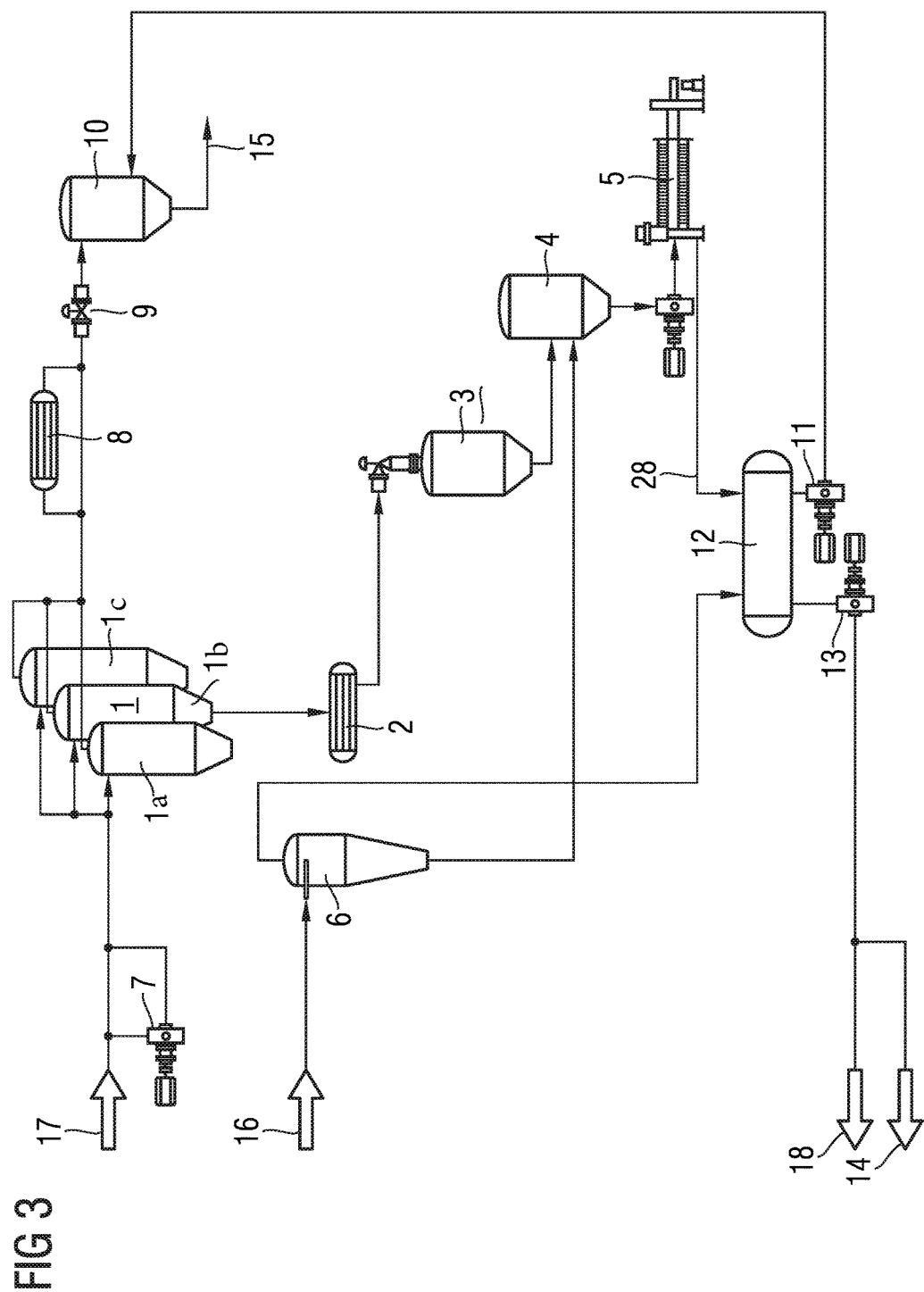
FIG. 3 shows closer details of the inventive soot water cleaning process.

According to FIG. 2, the excess residual quench water 17 arising during entrained-flow gasification is fed directly— or, during the startup process (when only small amounts of raw gas are present so there are only small differences in raw gas path pressure), via a booster pump group (7)—to a mechanical pressure filter system (1). The filter system (1) is designed such that the processes of filtration, filter cleaning, and filter cake discharging always take place in a spatially and temporally separate manner, although the overall process is quasi-continuous and uninterrupted. For that purpose a plurality of filter chambers are employed to which soot water is applied individually or in an overlapping manner, with one or more filter chambers being operated in the filtration mode and others in the cleaning and discharging mode.

The resulting filtrate is fed directly into the quench water storage tank (10), from where it is ducted as quench water (15) directly to the quencher (21). The filter throughput rate is regulated as a function of the fill level in the quencher. The time interval for the filtration performed in the individual filter chambers is variable and is set as a function of how solids-laden the soot water is and of the respective flow rate determined by the fill-level regulator (9). Only small temperature and pressure losses occur therein with respect to the exiting residual quench water and only a small additional amount of energy has to be expended to overcome the remaining pressure difference in order to bring the filtrate that is to be returned back to the gasification pressure.

The filter cake concentrated in the soot water or, as the case may be, residual quench water or, as the case may be, residual quench water during filter cleaning is expelled from the filter chambers (1$a$, 1$b$, 1$c$) of the pressure filter system (1) into the pressure reducer (3) as slurry by means of reducing valves. Prior to said reduction the slurry is cooled to temperatures of 40-90° C. in a slurry cooler (2), a heat exchanger specifically designed for solids, to avoid flash evaporation with potential calcite precipitation. Said small amount of slurry is then fed to a further concentrating process in the form of press filtration (5) or suchlike and the filtrate thereby obtained is ducted into the wastewater receptacle (12), partially or completely expelled from the process via the wastewater pump (13) as wastewater, or used in the slag discharging system as scrubbing water. Any remaining amounts of circulation water can be fed back into the process via scavenge pumps (11) (low-capacity high-pressure pumps).

Within the scope of the present invention, the cold, solids-laden slag water from the slag sluice system is first pre-cleaned by means of a hydrocyclone stage (6) and/or an additional filter unit under the application of low pressure of around 0.3 to 0.4 MPa (3-4 bar). The underflow from the cyclone or the filter cake of the additional filter unit reaches the sludge storage tank (4) along with the slurry from the pressure filter system (1) and is fed to a further dewatering stage (press filtration) (5) in order to be concentrated further. The overflow of the hydrocyclone or the filtrate of the additional filter unit passes directly into the wastewater receptacle (12). The wear caused by the slag water during a pump-over operation can be reduced to a minimum in this way. When the gasification system is being shut down by means of shutdown coolers (8) the quench water circuit can be cooled from its operating temperature (150° C. to 220° C.) to temperatures allowing hazard-free flash evaporation of the gasification system without causing the circuit water to evaporate.

The invention claimed is:

1. A pressure filtration system for continuous cleaning of residual quench water from a gasifying device that gasifies carbon-containing fuels under gasification pressure, comprising:

a parallel filter wherein the filter has a plurality of pressure filter chambers operated alternately or in parallel in filtering mode or in cleaning mode under gasification pressure;

a quencher in fluid communication with the filter;

a quench water in fluid communication with the quencher wherein the filter is in fluid communication with the quench water reservoir; and a pressure reducer in fluid communication with the plurality of pressure filter chambers via reducing valves, wherein soot water from the quencher is fed to the filter with no substantial reduction in pressure or flash evaporation to ambient pressure, wherein filtrate from the plurality of pressure filter chambers is fed to the quench water reservoir and the quencher is fed with quench water from the quench water reservoir, and wherein a concentrated filter cake is expelled from the filter chamber during filter cleaning into the pressure reducer as a slurry by means of the reducing valves, wherein the gasification pressure is in a range from 2 MPa to 5 MPa.

2. The pressure filtration system as claimed in claim 1, wherein a throughput rate of the filter is a function of a fill level in the quencher.

3. The pressure filtration system as claimed in claim 1, wherein the soot water is fed to the filter directly from the quencher or via an intermediate container connected in between.

4. The pressure filtration system as claimed in claim 1, further comprising a fill-level regulator, wherein a time interval for the filtration performed in the individual pressure filter chambers is set as a function of the respective flow rate determined by the fill-level regulator.

5. The pressure filtration system as claimed in claim 1, further comprising a slurry cooler, wherein the slurry is cooled in the slurry cooler prior to reduction to temperatures of 40-90° C.

6. The pressure filtration system as claimed in claim 1, further comprising a booser pump group, wherein the soot water is fed to the filter during a startup process via the booster pump group at low gasification pressure.

7. The pressure filtration system as claimed in claim 1, further comprising a plurality of shutdown coolers, wherein the cleaned/filtered soot water is cooled during a shutdown process by means of the plurality of shutdown coolers with an accompanying reduction in pressure.

8. The pressure filtration system as claimed in claim 1, further comprising a wastewater receptacle, wherein slag water from a slag sluice system is cleaned in a filter unit at pressures of around 0.3 to 0.4 MPa (3-4 bar) and fed directly to the wastewater receptacle.

9. The pressure filtration system as claimed in claim 8, further comprising a sludge storage tank and a dewatering stage, wherein an underflow from the filter unit is fed to the sludge storage tank and to the dewatering stage.

10. A method to clean residual quench water by continuous pressure filtration, comprising:

feeding soot water from a quencher to a parallel filter with no substantial reduction in pressure or flash evaporation to ambient pressure wherein the parallel filter has a plurality of filter chambers operated alternately or in parallel in filtering mode or in cleaning mode under gasification pressure; and expelling a concentrated filter cake from each filter chamber of the plurality of filter chambers during filter cleaning into a pressure reducer as a slurry by means of reducing valves, wherein gasification pressure lies in a range of 2 MPa to 5 Mpa, wherein the quencher is in fluid communication with the filter, and wherein the pressure reducer is in fluid communication with the plurality of pressure filter chambers via the reducing valves.

* * * * *